United States Patent [19]
Esposito

[11] Patent Number: 6,101,496
[45] Date of Patent: Aug. 8, 2000

[54] ORDERED INFORMATION GEOCODING METHOD AND APPARATUS

[75] Inventor: David J. Esposito, Delmar, N.Y.

[73] Assignee: MapInfo Corporation, Troy, N.Y.

[21] Appl. No.: 09/093,259

[22] Filed: Jun. 8, 1998

[51] Int. Cl.[7] ................................................. G06F 17/30
[52] U.S. Cl. .......................... 707/6; 379/220; 701/207; 701/208; 705/10; 705/62; 707/3; 707/4; 707/5; 707/7; 707/104
[58] Field of Search ..................... 707/3–8, 104, 707/530, 532; 701/207–208; 705/10, 62; 379/220

[56] References Cited

U.S. PATENT DOCUMENTS

| | | | |
|---|---|---|---|
| 4,827,419 | 5/1989 | Selby, III | 707/104 |
| 4,839,700 | 6/1989 | Ramesham et al. | 357/2 |
| 4,879,658 | 11/1989 | Takashima et al. | 701/207 |
| 4,888,699 | 12/1989 | Knoll et al. | 701/207 |
| 4,982,332 | 1/1991 | Saito et al. | 701/208 |
| 4,989,151 | 1/1991 | Nuimura | 701/207 |
| 5,133,052 | 7/1992 | Bier et al. | 707/530 |
| 5,210,868 | 5/1993 | Shimada et al. | 701/200 |
| 5,381,338 | 1/1995 | Wysocki et al. | 701/207 |
| 5,426,780 | 6/1995 | Gerull et al. | 707/3 |
| 5,448,696 | 9/1995 | Shimada et al. | 345/357 |
| 5,470,233 | 11/1995 | Fruchterman et al. | 434/112 |
| 5,487,139 | 1/1996 | Saylor et al. | 345/435 |
| 5,506,897 | 4/1996 | Moore et al. | 379/127 |
| 5,532,838 | 7/1996 | Barbari | 358/400 |
| 5,533,107 | 7/1996 | Irwin et al. | 379/201 |
| 5,546,578 | 8/1996 | Takada | 707/5 |
| 5,553,407 | 9/1996 | Stump | 37/348 |
| 5,568,384 | 10/1996 | Robb et al. | 707/532 |
| 5,594,650 | 1/1997 | Shah et al. | 701/207 |
| 5,634,049 | 5/1997 | Pitkin | 707/102 |
| 5,636,122 | 6/1997 | Shah et al. | 701/207 |
| 5,646,629 | 7/1997 | Loomis et al. | 701/300 |
| 5,794,178 | 8/1998 | Caid et al. | 704/9 |
| 5,901,214 | 5/1999 | Shaffer et al. | 379/220 |
| 5,982,868 | 11/1999 | Shaffer et al. | 379/220 |

OTHER PUBLICATIONS

Fiset, R. et al., "An automatic road extraction method using a map–guided approach combined with neural networks for cartographic database validation purposes", International Geoscience and Remote Sensing Symposium, May 1996. IGARSS '96. Remote Sensing for.

Kamijo, S. et al., "Digital road map database for vehicle navigation and road information systems", Conference Record Vehicle Navigation and Information System Conference, Sep. 11–13, 1989, pp. 319–323.

Kawamura, H. et al., "N–land database for research of the Japanese land and coastal are with complicated geographical features", International Geoscience and Remote Sensing Symposium, IGARSS '93. Better Understanding of Earth Environment, Aug. 18–21, 1993.

Silberschatz, A. et al., "Operating System Concepts", Addison–Wesley Publishing Company, Inc., Fourth Edition, Jan. 1995, ISBN 0–201–50480–4, Chapter 3, sections 3.3.3 and 3.3.5, pp. 72–73.

Suter, M. et al., "Automated generation of visual simulation databases using remote sensing and GIS", Proceedings, IEEE Conference on Visualization, 1995. Visualization '95., Oct. 29–Nov. 3, 1995, pp. 86–93.

Sweeney, I.E., Jr., "Comparative benefits of various automotive navigation and routing technologies", IEEE 1996 Position Location and Navigation Symposium, Apr. 22–26, 1996, pp. 415–421.

*Primary Examiner*—Thomas G. Black
*Assistant Examiner*—Shahid Alam
*Attorney, Agent, or Firm*—Jaeckle Fleischmann & Mugel, LLP

[57] ABSTRACT

Ordered information data 22 is combined with prior geocoded data 21 to improve geocoding. The combined records are sorted by precision 33. The two highest precision groups are interpolated to further geocode the records and provide enhanced street address products 42.

29 Claims, 14 Drawing Sheets

| Rec # | Geocode Type | Preci-sion | Full Address | City | Zip | Zip+4 | Longitude | Latitude |
|---|---|---|---|---|---|---|---|---|
| 1 | Street Level | S5 | 000063 MCKOWN RD | ALBANY NY | 12203 | 3431 | -73.8404 | 42.6746 |
| 2 | Zip+4 centroid | S3 | 000112 MCKOWN RD W | ALBANY NY | 12203 | 5925 | -73.844 | 42.6748 |
| 3 | Zip+2 centroid | S2 | 000218 FERNDALE ST N | SAINT PAUL MN | 55119 | 4711 | -92.9907 | 44.9444 |
| 4 | 5 digit Zip centroid | S1 | 000140 115th ST | AUBURN WA | 98002 | 0000 | -112.2134 | 47.3089 |
| 5 | 5 digit Zip centroid | S1 | 000000 PO BOX 1423 | CLIFTON PARK NY | 12065 | 0806 | -73.7889 | 42.847 |
| 6 | 5 digit Zip centroid | S1 | 000078 CHERRY AVE RD | DELMAR NY | 12054 | 0000 | -74.1909 | 42.7544 |
| 7 | Ungeocoded | N | 5593 BRIDLE CT | | 00000 | 0000 | 0 | 0 |
| 8 | Ungeocoded | N | SAN BERN-ADINO AVE | ONTARIO CA | 00000 | 0000 | 0 | 0 |
| 9 | Ungeocoded | N | 225 SCOTT ST | RIALTO CA | 92376 | 0000 | 0 | 0 |
| 10 | Ungeocoded | N | 000000 | EAST BERNE NY | 00000 | 0000 | 0 | 0 |

FIG.1a

| Rec # | Geocode Type | Precision | OI Record ID | Full Address | City | Zip | Zip+4 | Cencus FIPS | Longitude | Latitude |
|---|---|---|---|---|---|---|---|---|---|---|
| 1 | Street Level | S5 | 308906300 7000040170 000000 | 000063 MCKOWN RD | ALBANY NY | 12203 | 3431 | 3600101 4609213 (Cencus Block) | -73.8404 | 42.6746 |
| 11 | OIG Process | Cencus Block centroid | 308906300 7000040195 000000 | 000100 ELM ST | ALBANY NY | 00000 | 0000 | 3600101 4609213 (Cencus Block) | -73.8359 | 42.6734 |

FIG.1b

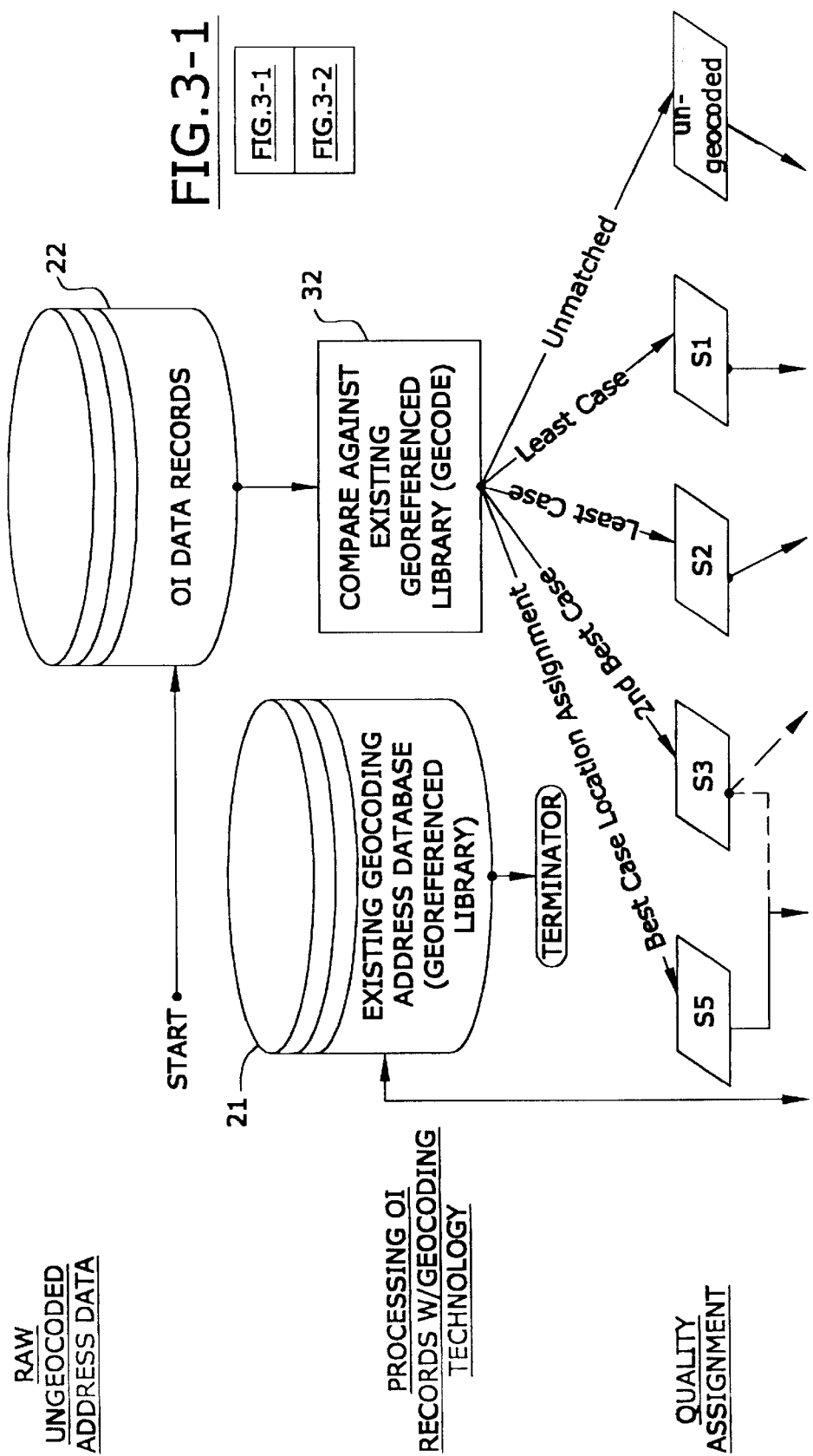

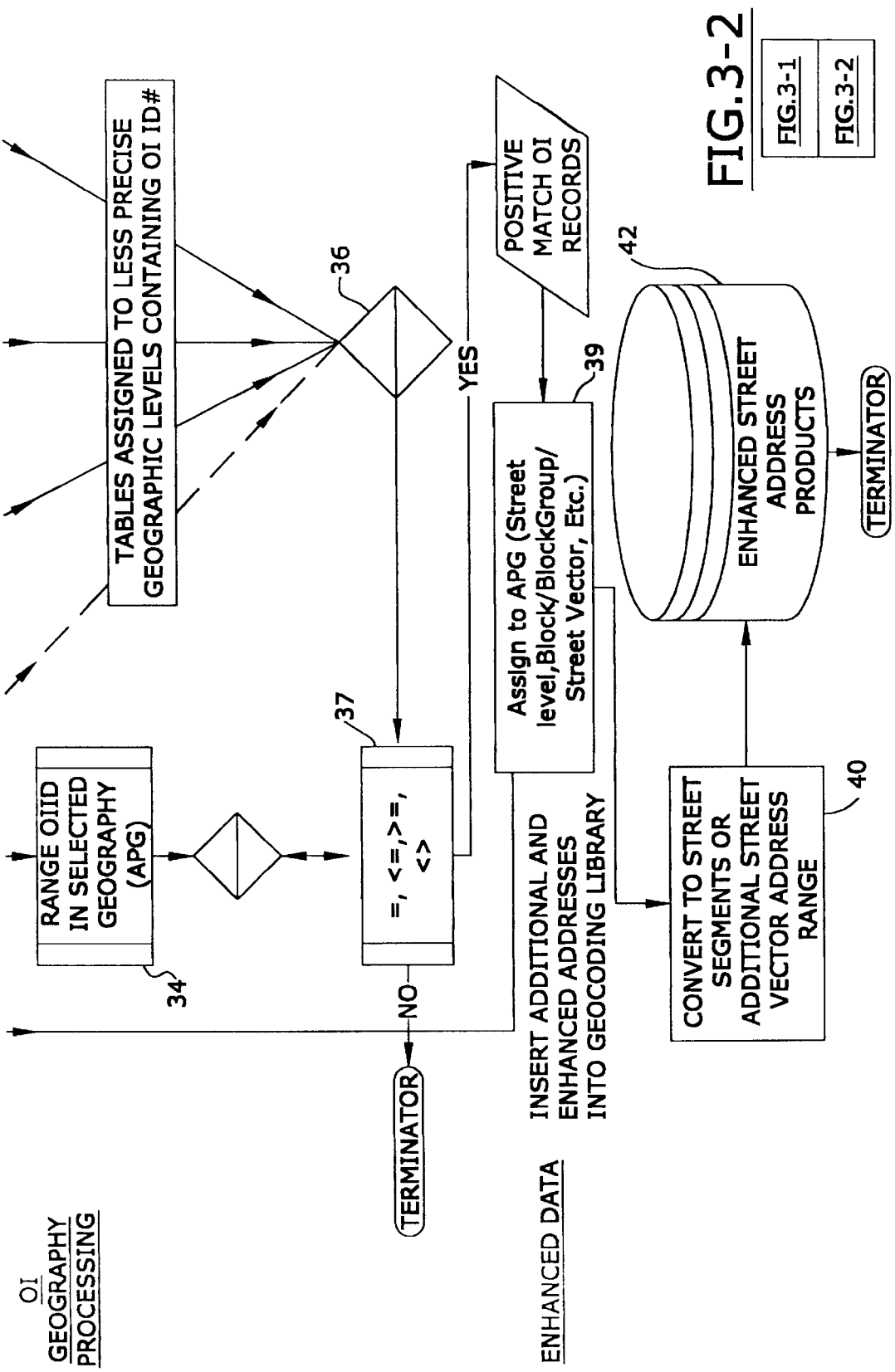

ZIP+4 CENTROID COORDINATE POINT FILE for NEW YORK STATE

TOTAL CENTROIDS CONTAINED IN THE FILE..................... 3,041,117
ACTUAL ZIP+4 CENTROIDS........................................ 1,169,348
CENTROIDS FALLING BACK ON ZIP+2........................... 111,011
CENTROIDS FALLING BACK ON 5 DIGIT ZIP..................1,760,758

FIG.8

| NAME | TYPE | DIST. TO STREET SEGMENT (miles) |
|---|---|---|
| Schoharie Plank | OIG results | 0.37548 |
| Schoharie Plank | S1 | 0.252197 |
| Schoharie Plank | OIG results | 0.385999 |
| Schoharie Plank | S1 | 0.174398 |
| Woodlake | S1 | 0.489561 |
| Woodlake | OIG results | 2.57357 |
| Warners | OIG results | 1.30883 |
| Warners | S1 | 3.23905 |
| Zimmer | OIG results | 1.04146 |
| Zimmer | S1 | 4.76698 |
| BerneAltamont | OIG results | 2.39379 |
| BerneAltamont | S1 | 6.54875 |
| Old River | OIG results | 0.677801 |
| Old River | S1 | 0.908328 |
| Knox Cave | OIG results | 1.12962 |
| Knox Cave | S1 | 4.75188 |
| Hillcrest | OIG results | 0.0714652 |
| Hillcrest | S1 | 1.12356 |
| Hillcrest | OIG results | 0.0878809 |
| Hillcrest | OIG results | 0.113268 |
| Hillcrest | OIG results | 0.162749 |
| Hillcrest | S1 | 1.98392 |
| Hennessey | OIG results | 0.65584 |
| Hennessey | S1 | 1.39056 |
| Grant Hill | OIG results | 2.65294 |
| Grant Hill | S1 | 4.30054 |
| Elsmere | OIG results | 0.259352 |
| Elsmere | S1 | 2.29705 |
| Eisenhower | OIG results | 0.049386 |
| Eisenhower | S1 | 2.1967 |
| Eisenhower | OIG results | 1.53794 |
| Depot | OIG results | 1.62788 |
| Depot | OIG results | 2.74614 |
| Depot | S1 | 4.68048 |
| Depot | S1 | 2.72041 |
| Charles | OIG results | 0.0954894 |
| Charles | S1 | 2.14148 |
| Campbell | OIG results | 0.0989823 |
| Campbell | S1 | 2.26046 |

FIG.10

ORDERED INFORMATION GEOCODING METHOD AND APPARATUS

BACKGROUND

The background and the invention are best understood by defining certain terms including: geocoding, centroids, and street vectors/segments.

Geocoding is the act, method or processes of programmatically assigning x and y coordinates (usually but not limited to earth coordinates—i.e., latitude and longitude) to records, lists and files containing location information (full addresses, partial addresses, zip codes, census FIPS codes, etc.) for cartographic or any other form of spatial analysis or reference. Geocoding is even more broadly described as "mapping your data" in order to visualize information and exploring relationships previously unavailable in strict database or spreadsheet analysis.

A centroid is a geographic center of an entire area, region, boundary, etc. for which the specific geographic area covers.

Street vectors are address ranges that are assigned to segments of individual streets. Street vectors are used in displays of digitized computer based street maps. Street vectors usually appear as left and right side address ranges. They are also used for geocoding a particular address to a particular street segment based on its point along the line segment. For example, the table below shows the address range on both sides of the street for one particular street segment of Main St.:

| Street  | FromLeft | ToLeft | FromRight | ToRight |
|---------|----------|--------|-----------|---------|
| Main St | 2500     | 2536   | 2501      | 2549    |

Geocoding

Geocoding is currently performed by running ungeocoded (referred to hereafter as "raw data") information such as a list of customers through proprietary software and/or data which performs table lookup, fuzzy logic and address matching against an entire "library" of all known or available addresses (referred to hereafter as "georeferenced library") with associated x,y location coordinates. The raw data that match the records from the georeferenced library are then assigned the same x, y coordinates associated with the matched record in the georeferenced library.

The georeferenced library is compiled from a number of varied sources including US Census address information and US Postal address information, along with Zip Code boundaries and other various sources of data containing geographic information and/or location geometry. If a raw data address cannot be matched exactly to a specific library street address (known as a "street level hit"), then an attempt is made to match the raw data address to an ever decreasing precision geographic hierarchy of point, line or region geography until a predetermined tolerance for an acceptable match is met. The geographic hierarchy to which a raw data record is finally assigned is also known as the "geocoding precision." Geocoding precision tells how closely the location assigned by the geocoding software matches the true location of the raw data. Current geocoding technology generally provides for two main types of precision: Street Level and Postal ZIP Centroid. Street Level precision is the placement of geocoded records at the street address. (See FIG. 1, record no. 1.) Street level precision attempts to geocode all records to the actual street address. In all likelihood, some matches may end up at a less precise location such as a ZIP centroid (ZIP+4, ZIP+2, or ZIP Code) or shape path (the shape of a street as defined by points that make up each segment of the street). A record is assigned or geocoded to the centroid of the shape path (S4—not listed in FIG. 1 as this is a rare occurrence) if the matching street address does not contain address ranges.

ZIP centroid precision places geocoded records at a postal record ZIP Code centroid. ZIP centroid precision matches a raw data record to the most precise ZIP Code it finds. The most precise postal match is one made to a ZIP+4 centroid. See FIG. 1, record no. 2. ZIP+4 is nearly as precise as a street level hit (street address). If a ZIP+4 centroid cannot be matched or does not exist, a match may then fall back to a ZIP+2 centroid (record no. 3) if available. The least accurate postal match is one made to a 5 digit ZIP centroid (record nos. 4, 5, 6.) If no street level or postal match can be found in the georeferenced library, then a record remains ungeocoded (record nos. 7, 8, 9, 10). This can be the result of a lack of information in the georeferenced library (new building/development, address overlooked/not included, etc.) or a lack of information (missing address information, etc.) in the raw data records which are being geocoded.

One of the disadvantages of ZIP Code matching alone (without street address) is that current geocoding technology only examines the ZIP Code field when matching. If the ZIP Codes in the raw data records do not already have ZIP+4 values, then current geocoding technology will only match to the much larger area 5-digit ZIP Code centroids. Conversely, if you use Street Level precision, current geocoding technology will attempt to return street-level coordinates and will optionally fallback to the slightly less precise ZIP +4 coordinates. If the georeferenced library does not contain a full 9 digit ZIP Code (ZIP +4) x,y location for the raw data address, current geocoding technology will fallback on the less precise 5 digit ZIP coordinates.

As described above, another disadvantage of ZIP code matching is that ZIP+4 centroids may not exist at all and the only option is a fallback to the much larger area 5-digit ZIP Code centroid. An examination of current (January, 1998) ZIP+4 centroid availability bares out the problem of relying solely on ZIP+4 centroid placement when a specific street level address can not be found for a raw data record. FIG. 8 shows the breakdown of the ZIP+4 file for New York State. Fully two thirds of the centroids found in the file are not actually ZIP+4 centroids at all, but merely the less precise 5 digit ZIP or ZIP+2 centroids.

The geocoding process assigns ever larger geographic aggregations (or less precision) to raw data records until most if not all the raw data records have been geocoded. As a result, some form of location coordinate or spatial attribute is assigned to as many raw data records as possible. Those records which cannot be geocoded due to missing address information or unknown address information are separated from the rest of the records and classified as "ungeocoded" records.

Current technology does not allow for geocoding in most geographic locations throughout the world. Other than North America and, in particular, the United States, very little if any geocoding technology exists due to:

a lack of technological resources no infrastructure for systematic and current upkeep of street addresses absence of government sponsored programs or agencies for inclusion of meaningful amount of total existing addresses addresses not available in digital form such information withheld from public usage as an eminent domain of government alone.

Current geocoding technology cannot be implemented under the above conditions. Those conditions hinder the proliferation of geocoding technologies to many nations which would benefit from such technologies.

Street Vectors

In the United States, the U.S. Census Bureau assigns street vectors. They are assigned during the decennial census by enumerators or "street canvassers" who do the actual census taking. Those address ranges are then compiled, digitized and otherwise made into street segments that contain address ranges or street vectors as described above. A compilation of those computer mapped streets for the entire U.S. is then made available for purchase through the Topologically Integrated Geographic Encoding and Referencing (TIGER) digital database.

Many companies resell TIGER information in a more specific, user friendly and/or proprietary format. The resold information often adds value to the original TIGER data by using various proprietary algorithms and methods. Some resellers create new street segments not included by the Census Bureau at the time of enumeration. Many use digitizing and data transfer to propagate street segments.

SUMMARY

The invention recognizes that there are a number of non-traditional data sources with geographically ordered information (OI). These non-traditional OI data sources include and are not limited to: tax property parcel records as maintained by state, county and municipal offices; insurance, disaster abatement, and fire code/regulatory records; various government records and privately held databases. The tax property parcel records are kept by state, county and municipal assessors offices for the maintenance of tax assessment, levy and property management. They offer unique OI. In most cases they are current, include new building developments, and offer a more comprehensive address database than traditional census and postal records. As such, OI records may not match addresses in traditional georeferenced libraries used in current geocoding technology. Therefore, it is not possible to assign precise x,y locations to those records that are not included in the traditional georeferenced library. That can pose a problem when geocoding a customer list in a new developments or in areas overlooked or not completely canvassed by the decennial census, for example. A georeferenced library based upon traditional (census and postal records) may not include precise street address coordinates for the new developments, etc. In such cases, the geocode precision will fall back to the less precise 5 digit ZIP code centroid found in the postal data portion of the georeferenced library. See FIG. 1 for samples of different types of geocoding precision. However, I have discovered a way of adding the OI information to the traditional database and for interpolating OI data to further enhance the precision of the georeference database.

The ordered information geography (OIG) algorithm process generates a much more precise x,y (z) coordinate placement at the Census Block centroid, Block Group centroid or other smaller area geography. By using the OI record identification keys (OIID), such as the property parcel identification number as assigned by the assessor, and then algorithmically processing them and including them in the georeferenced library, records are further geocoded with the OIID inherent geography. After geocoding in the traditional manner using existing geocoding technology, we assign locational coordinates to many of the OI records in a given area. We next use a series of select dialogues and programmatic queries to prepare those OI identification keys that are attached to the already geocoded records for greater location precsion assignment of less precise and ungeocoded records. We then assign a similar coordinate to the less precise and ungeocoded records based on similar or ranged and sorted on predetermined criteria OI identification keys. These additionally geocoded records are assigned to more precise centroids such as a census block centroid which can be the next best thing to actual rooftop or street level geocoding.

Additionally, by programmatically describing the geography in a particular sequential, alphanumeric or other OI record identification key configuration, we can further assign a more specific or rooftop coordinate to the previously ungeocodable records through interpolation from the surrounding geocoded OI records. This method provides direction, street side placement and other location information based on anchor points which are known, precisely geocoded records within the OI data set.

DESCRIPTION OF THE DRAWINGS

FIG. 1a is a table showing examples of prior art geocoded records with data fields including centroids of different precision including: street level hits, ZIP+4 hits, ZIP+2 hits, ZIP hits, and ungeocoded records;

FIG. 1b shows how goecoded records are improved with ordered information data;

FIG. 3 is a high level flow diagram of a computer program for carrying out the invention;

FIG. 4 also describes the method to enhance the street segment address library;

FIG. 8 is a table of the ZIP+4 centroids in New York State;

FIG. 10 is a table of centroids taken before and after running the computer program;

DETAILED DESCRIPTION

Geocoding

Figure 2:
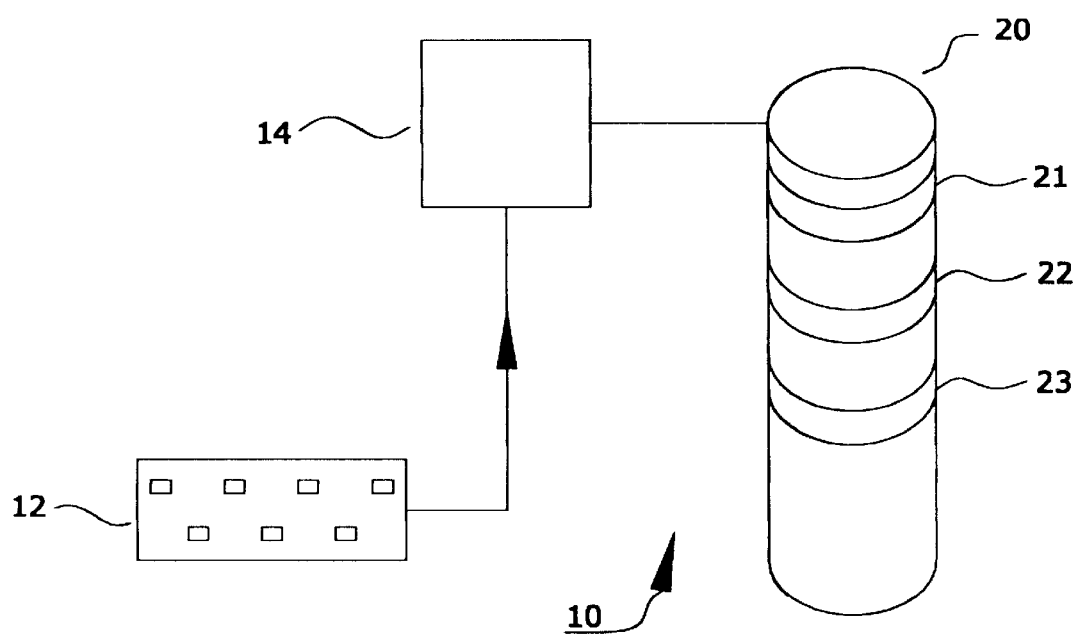
FIG. 2 is schematic diagram of computer programmed to carry out the geocoding of the invention.

FIG. 1a shows ten records. Each record comprises data fields for a traditional type of geocode. Each record shows its precision (if any), address, city, ZIP, ZIP+4, ZIP+2, Census FIPS and the longitude and latitude (if available) for the property corresponding to the record. Note that the last four records have no longitude or latitude data. Record 7 is only a street name and number with no city, state or ZIP information and thus has no address making it impossible to geocode using the existing georeferenced library. Record 8 has no street number and no ZIP code and therefore could not be assigned a location. Record 9 is possibly a new development which could not be matched with the existing georeferenced library. Record 10 has no address information other than city.

With the invention, records with data fields of ordered information are added to the existing records. The OIID and Census FIPS data have inherent geographical information on the proximity of one parcel to another. As a first step, OIID and Census FIPS data are added to existing records. See record 1 in FIG. 1b where the OIID and the Census FIPS are added. New record 11 has OI information and Census FIPS, but has no ZIP data. When record 11 is added to the database, the ordered information is interpolated with the ordered information in record 1 to provide longitude and latitude for record 11. Compare the OID information for the 100 Elm Street record with the OIID for the 63 McKown record. Both have the same first line and their second lines differ by only 25 units. As such, a location can be assigned to record 11 based on the enhanced data of record 1.

Ordered Information Geography

The OIG process from initial geocoding of OI records to final placement and merging with the Georeferenced Library (GL) and the Street Segment Address Data (SSAD) is a defined sequential process involving various data merging, matching and logic. See FIG. 2. The operations are a combination of traditional geocoding, current database querying (SQL) and arithmetic and logical operations upon the OI and the GL. The invention is a unique combination of these functions that produces additional x,y,(z) coordinate locations along with their associated address records. See FIG. 4. These additional records are inserted into the GL to increase the total number of georeferenced library records. The process increases the efficacy of total possible geocoded records in any given geocoding run session. The additional records are also inserted into the SSAD to create more display information and address vectors (ranges).

The most precise (usually street level) geocoded records are assigned to the highest possible precision small area geometry for the particular geocoded area. In the United States, such records are usually the Census Bureaus TIGER records. They provide digital coverage of approximately seven million Federal Information Process Standard (FIPS) blocks whose individual borders represent the street segments found in computer cartographic street display and address products. In urban areas, FIPS blocks are often the smallest digital area geometry available. It usually corresponds to an actual city block. The goal of this invention is to geocode to the center of the available highest precision small area geometry, which in the US is usually the FIPS Block centroid. Another precise small area geometry is the ZIP+4 coverage for the United States. However, ZIP+4 coverage is spotty at best and geocoders often fall back to the much less precise 5 digit ZIP. Consider, for example, the ZIP codes used in New York State. As shown in FIG. 8, there are over three million ZIP code centroids in New York. However, less than half are ZIP+4 and more than half are simple 5-digit ZIP codes. Any geocoded New York information based on ZIP codes will have very limited precision because more than half of the ZIP+4 x,y locations may fall back to the ZIP centroid. However, the OIG process of the invention improves precision by assigning more precise locations to many of the existing (and future) 5, 7 and 9-digit ZIP codes.

The invention increases the total number of raw data records that are geocoded by using a new methodology in combination with current geocoding technology. With reference to FIGS. 2 and 3, the invention comprises a computer with the inventive program, the program stored on a disc, and a series of steps for operating a computer to improve an existing geocoded library. Its novel features include geocoding OI records using current technology for various location precision assignments; merging high precision results with varying geographies (attaching precise geography such as block regions, etc.) as part of the geocode process; interpolating geocoded OI individual record identification keys and their sequential, alphanumeric or other location component in order to assign more precise locations to records and to an enhanced highly precise or higher precision locations; merging these enhanced precision non-traditional OI location records with the georeferenced library in order to create a larger georeferenced library for improved geocoding.

FIG. 2 shows a computer system 10 including a central processing unit (CPU) 14. The CPU 14 is well known. It may comprise a personal computer CPU or a large, main frame CPU. It has one or more execution units including one or more arithmetic logic units and one or more floating point units. A user has an input device, such as a keyboard 12 to enter data into the computer 14. Other input devices may be used, including and not limited to a mouse. A memory 20 holds programs and one or more databases. Database 21 is an existing GL of first records. Database 22 has OI data in a second set of records. The CPU 14 compares the records in database 21 to those in the database 22 to generate a third set of records 23.

The program for generating the third set of records is shown in FIG. 3. In step 32 The OI database 22 is compared to the GL database 21 to generate a number of sorted, matched hits 33. The matched hits 33 are sorted by their relative precision. It is preferred to sort out the two highest precision matched sets, i.e., street level hits and ZEP+4 hits. In step 34 matched sets with the two highest precisions are sorted into ranges. In steps 36 and 37 the remaining records are interpolated, if possible, to increase their precision. The remaining, interpolated records are assigned to a given APG level 39, converted into street segments 40 and then update the GL 21 and provide enhanced street address products 42.

Figure 4:
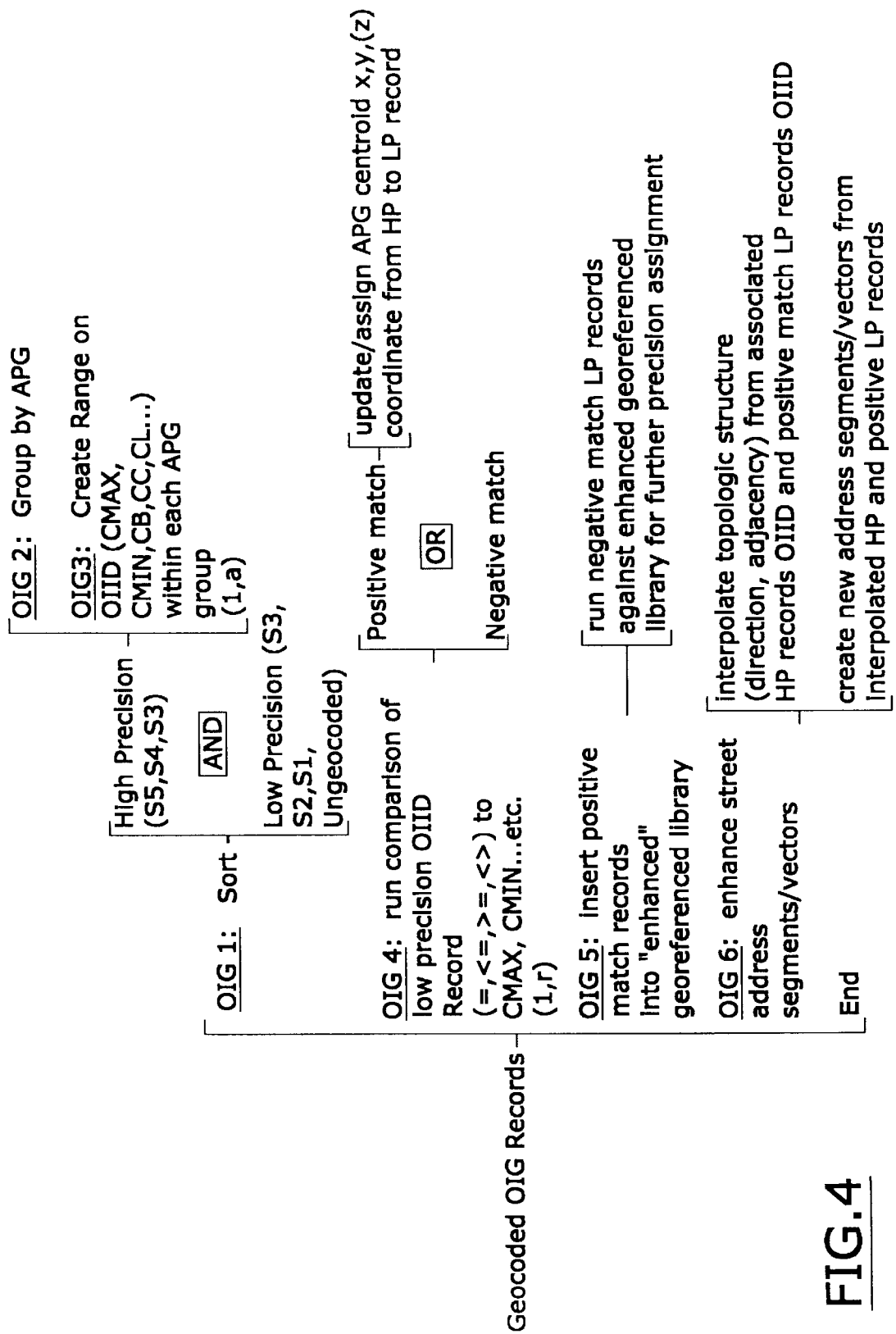
FIG. 4 is a more detailed Wanier—Orr diagram of the portion of the computer program that sorts the records by the precision of the centroids and assigns greater location precision to less precise geocoded OI records and ungeocoded OI records which are then inserted to enhance the georeferenced library.

With reference to FIG. 4, here is an explanation of the steps shown in the flow chart of that figure.

OIG 1. After initial geocoding and processing of OI records, the computer selects all from the S5, S4 and S3 (high precision [HP] street level geocoded records). In this case, the assigned precision geography (APG) is the 15 digit census FIPS block code. In this case, the APG is the 15 digit census FIPS block code. Each APG usually contains at least 2 or more geocoded point records.

OIG 2 The selections are grouped by APG in order to create process ranges on the ordered information unique record identification key (OIID). Placement criteria will be derived from the OIID for location assignment of less precise (LP) geocoded OI records and/or those OI records which could not be geocoded at all.

OIG 3. A sort of the OIID within current APG selected records is performed and selection criteria are created in order to assign coordinate location to the less precise or ungeocoded records. Selection criteria include maximum (CMAX) and minimum (CMIN) for a range of acceptable OID's within the current APG; a "base" OIID (CB) which can be the mode, median or common denominator of all OIID records in the current APG; a similar column variable (CC) used as further selection verification and quality control; and a least area or representative sample OIID (CL) for the records in the current APG.

OIG 4. The criteria variables or match variables derived above are then used to create a selection statement for extracting match records (MR).

OIG 5. These MR address sets with their associated x,y,(z) coordinate locations are then inserted into the GL as described previously.

OIG 6. These MR address sets with their associated x,y,(z) coordinate locations are then used to create additional street segments/vectors in the SSAD as described previously.

Figure 5:
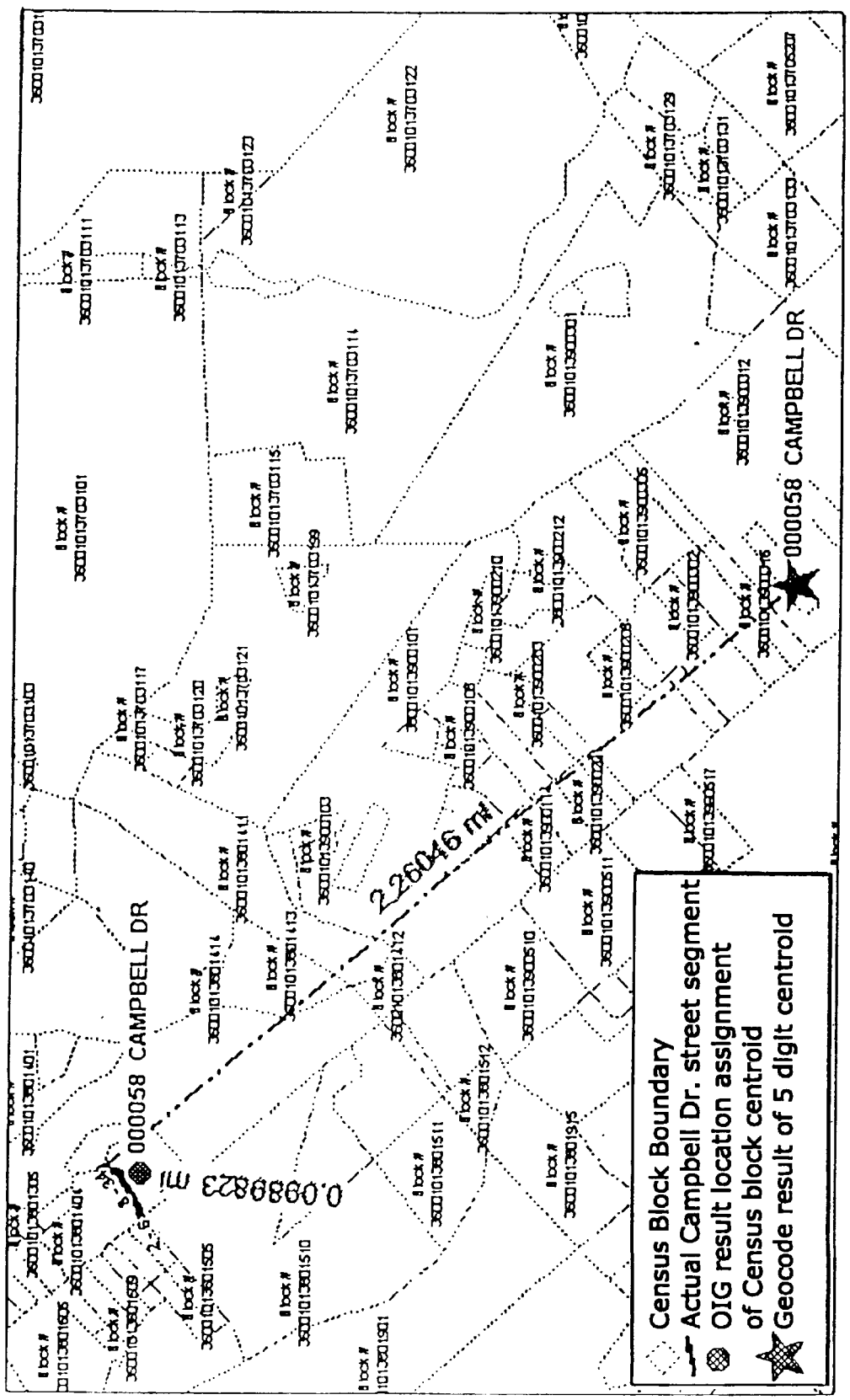
FIGS. 5, 6, and 7 are diagrams of examples of computer records before and after operation of the program.

FIG. 5 shows an example of how the invention improves a typical ZIP, centroid hit to a street level hit and thereby improves the geocoding by relocating the position of the address more than two miles closer to its actual location. Campbell Block is geocoded for addresses 2–6 and 8–34. It is not geocoded for 58 Campbell, which is assigned to its nearest ZIP centroid, the star shown in the lower middle of 5. However, after the existing library is enhanced with the OI taken from the tax roles, 58 Campbell is relocated to the upper left hand corner of FIG. 5. The change in precision is 2.16148 miles closer to the actual location.

Figure 6:
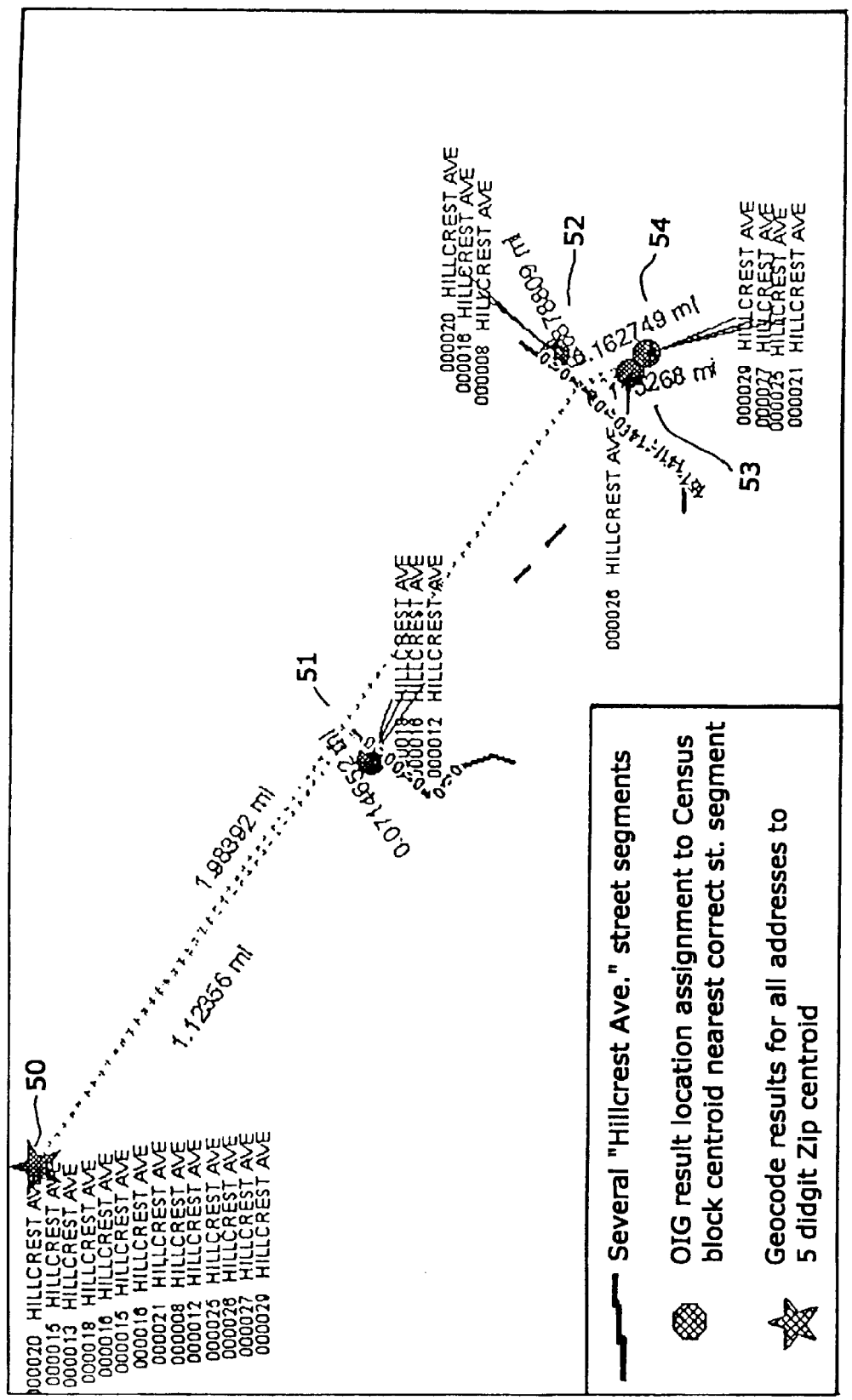

FIG. 6 illustrates a common difficulty of traditional geocoding and how the invention overcomes that difficulty. 6 shows how the invention assigns location in cases where several streets have the same name within a given area (zip, town, etc.). It is quite common for the same name street to pass through several different cities, villages and towns. It is also common that such address will have the same ZIP code. In FIG. 5, Hillcrest Avenue exists in Albany, N.Y. and small, adjacent community of Westmere, N.Y.

Traditional geocoding requires a user have intimate knowledge of the Albany area and the particular address she/he is attempting to geocode to know how to separate the Albany Hillcrest addresses from the Westmere Hillcrest addresses. In most cases, the user is not familiar with the geography of the area he/she is geocoding and the only option is to place a geocoded record to the 5 digit zip centroid precision in cases where the same street name is repeated within the same zip code. A centroid location 50 is given for 14 Hillcrest addresses. The OIG process places the location of the raw data record in the block centroid or interpolates a street level segment closest to the correct similarly named street. This information along with address specifics, etc. is stored in the enhanced georeferenced library lending more "intelligence" for future geocoding runs. As a result, the fourteen addresses are relocated to more precise locations 51–54.

Street Segments

A direct benefit from running the OIG process to increase the number of pinpointed x,y (z) addresses in the geocoding georeferenced library is the ability to interpolate from these addresses the near or exact location of new street segments containing the vector of these address ranges. The street segment product, as described, is often used to display information through various computer cartographic or presentation graphics. When an individual wishes to visualize a geocoded record set, these records are placed on their corresponding street vector and displayed upon various vector and/or raster coverages. Using existing street segment coverages, we can extend segments using the high precision OIG location points as determinants in assigning which vector to add to as well as direction and size of the new street segment.

Figure 7:
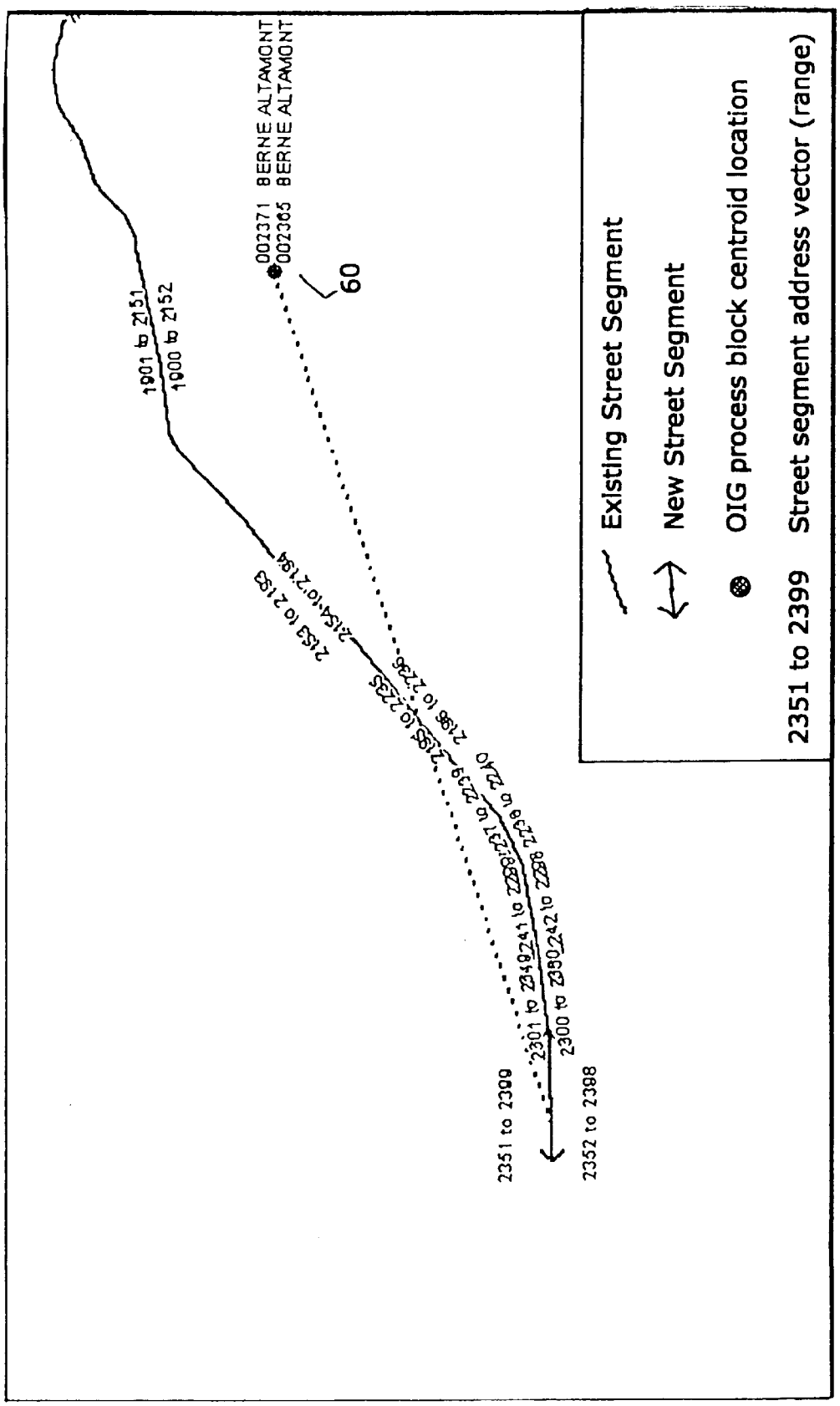

FIG. 7 shows how the invention locates new segments of streets in the existing database. Before the invention is used a Berne Altmont street segment has geocoded address 1900–2350 with a number of street level hits and with addresses 2371 and 2365 Berne Altmont located at ZIP centroid 60. Since 2371 and 2365 are not included in the street level hits, the database defaults to the ZIP centroid. The OI data indicates that there is a new segment of Berne Altmont with addresses 2351–2399. After processing the existing database with the relevant OI data, the new segment of 2351–2399 is added to the existing segment and the 2371 and 2365 Berne Altmnont addresses are relocated to the new segment based on the proximity of the OIG assigned point to the ending existing street segment, at locations 62, 63, respectively. In addition, the OIID of both the high precision geocoded OI records and the positive matched records of the less precise OI records which have been assigned greater precision through the OIG process can be used to create a topological structure, giving direction and adjacency for creation of new street segments/vectors in the SSAD. This topological structure can be interpolated from the inherent geographic information contained in the OIID once actual x,y location is assigned to sequentially proximate records using the OIG process, allowing for more precise placement of additional address ranges represented as street segments and/or points on a map. In addition to the invention creating new street segments and associated vectors from comprehensive address sources such as tax property parcel records, the high precision OI record location points and low precision records assigned a greater location precision through the OIG process can be used as "point vectors" or address ranges condensed to a single x,y coordinate point. This is in essence a way of adding entirely new "streets" to a street display or addressed products. Although represented graphically by a point rather than a street line, these provide higher geocoding hit rates when geocoding is performed through various proprietary software rather than against a georeferenced library in a geocoding engine.

EXAMPLE

FIGS. 9–12

Figure 9:
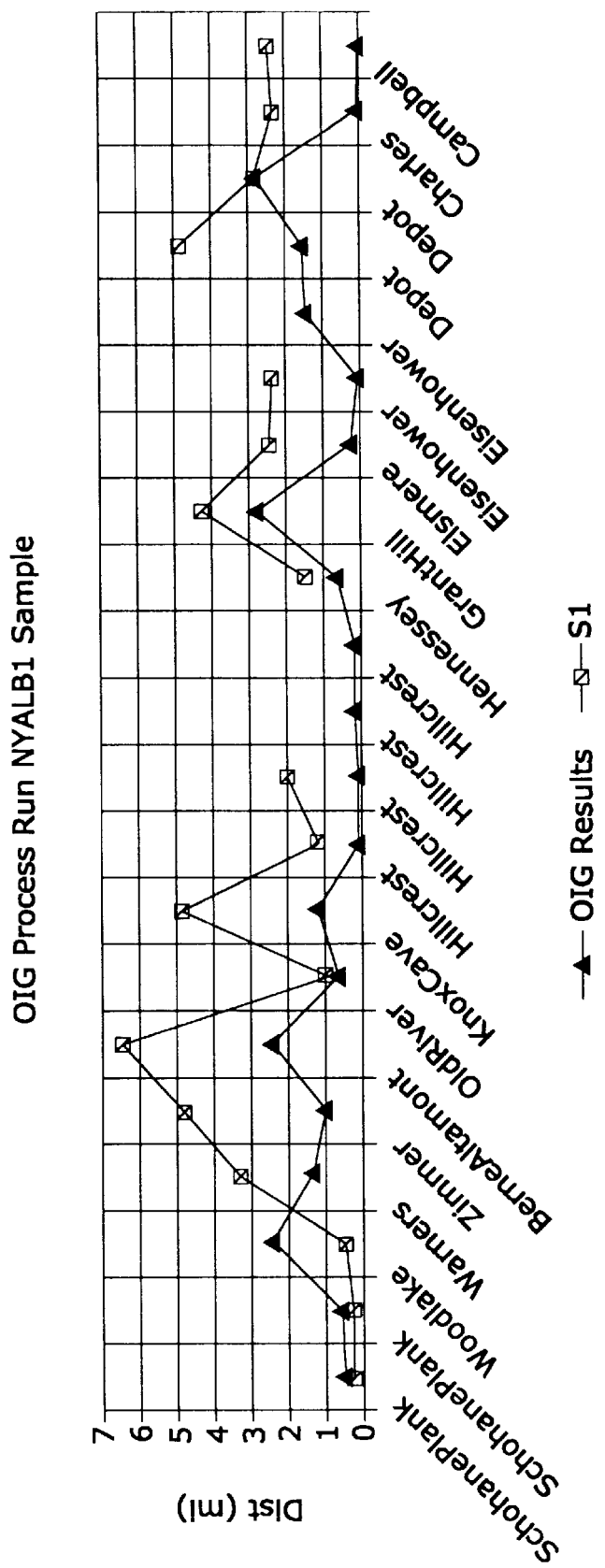
FIG. 9 is a graph of the changes in centroid location as a result of running the program.
Figure 11:
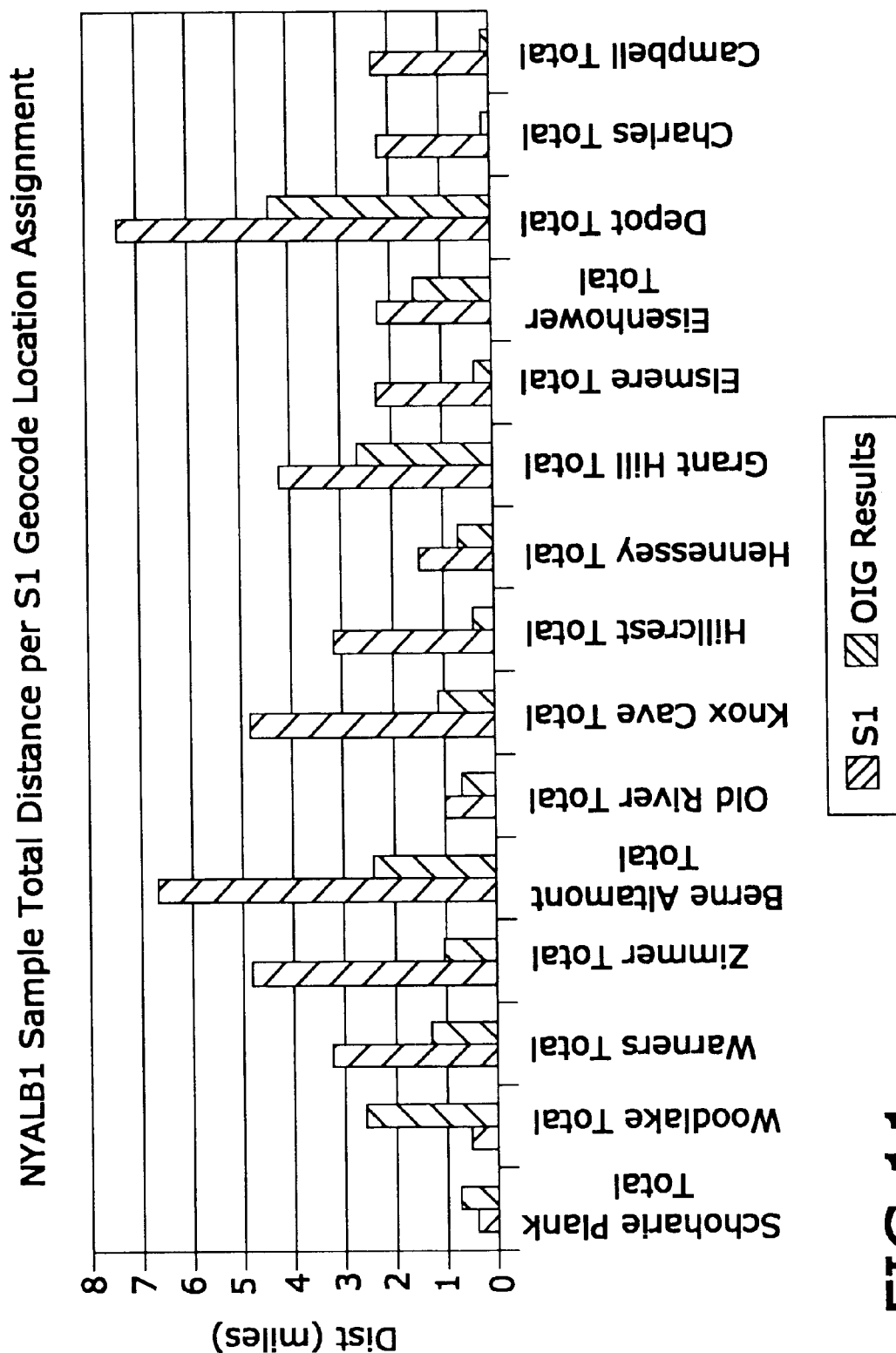
FIG. 11 is a bar graph comparing the results shown in the table of FIG. 10.
Figure 12:
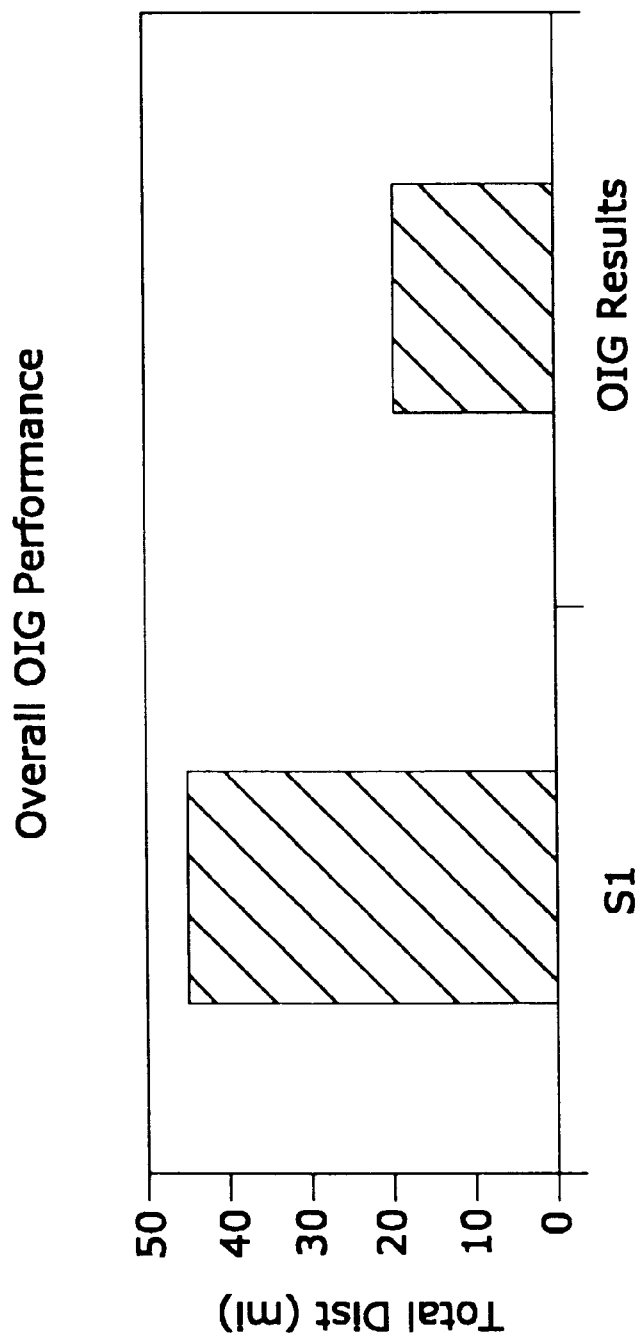
FIG. 12 is a bar graph of OIG performance.

A sample of an OIG process was run on Albany County in New York State. FIGS. 9 and 10 demonstrate how the invention makes more precise x,y location assignments to S1 or 5 digit Zip centroid location assignments than location assignments available through traditional geocoding methods. For various reasons (missing address information, same name streets in same small area geography and indiscernible match conditions) traditional geocoding returned a S1 (ZIP) precision level hit. Of 15 cases, 13 original S1 hits were more precisely located under the OIG process. This analysis was possible because a corresponding street segment was available at or near the true Cartesian location. See FIG. 11. A complete breakdown of the individual address assignments for each S1 assignment or group of assignments is shown in FIG. 10. FIG. 12 shows that overall location accuracy performance of the OIG process in comparison to S1 assignment under traditional geocoding methods is 2.3 times greater for this example.

Further modifications and applications of the invention maybe made without departing from the spirit and scope of the appended claims. For example, street address segments are enhanced by OIID and other tax property information. Using OIID data one can determine the direction of a street, what properties are adjacent to one another and the overall topology of a street, region, city, town or other geographic area.

What I claim is:

1. A method for improving a geocoded database comprising the steps of:

comparing a first set of geocoded database records to second set of records containing inherent geographic information, said first set of records each comprising a first number of data fields including data representing an identification of a geographic location corresponding to the record and data representing one of two or more geographic centroids representative of geographic areas including the location, said centroids from a centroid with highest precision to a centroid with lowest precision;

said second set of records comprising inherent geographically ordered data fields where said data represents a unique identification of a geographic location and the proximity of one record of one location to other records at other geographic locations and one or more data fields corresponding to the data fields of the records in the first set;

generating a plurality of matches where a record in the first set has a data field that matches a data field of a record in the second set;

sorting the matched sets by the centroids of the first set of records;

selecting matched sets with the highest precision centroids;

adding the geographically ordered data fields of the second set to the records matched in the first set to generate a third set of records.

2. The method of claim 1 comprising the further step of comparing the third set of records to the second set of records to identify records in the second set that are geographically proximate to one or more records in the third set;

changing the centroid of the identified records of the second set to correspond to the centroid of the most proximate record in the third set; and adding the geographically ordered data fields of the second set to the most proximate records of the third set.

3. The method of claim 1 wherein the centroids comprise at least four centroids of different precision.

4. The method of claim 3 wherein the centroids comprise street level, ZIP+4, ZIP+2, and ZIP.

5. The method of claim 1 wherein the step of selecting comprises selecting the matched sets for the highest and the second highest precision centroids.

6. The method of claim 5 wherein the highest and second highest precision centroids are street level and ZIP+4.

7. The method of claim 6 wherein the step of selecting matched sets comprises selecting matches with the highest and second highest precision centroids to create a third set of records;

and further comprising comparing the third set of records to the second set of records to identify records in the second set that are geographically proximate to one or more records in the third set;

changing the centroid of the identified records of the second set to correspond to the centroid of the most proximate record in the third set; and adding the geographically ordered data fields of the second set to the most proximate records of the third set.

8. The method of claim 1 wherein the records in both sets comprise data fields for the street address of the records and the matching step comprises comparing the street address data fields of records in the first set to the street address data fields of records in the second set.

9. The method of claim 1 comprising the further step of mapping further data to the third set of records.

10. The method of claim 1 comprising the further step of adding additional street address segments and points to existing street segment address data using topological structure interpolated from said second set and third set of records comprising inherent geographically ordered data fields where said data represents a unique identification of a geographic location and the proximity of one record of one location to other records at other geographic locations.

11. The method of claim 1 comprising the further step of adding additional street address segments and points to existing street segment address data from said second set and third set of records.

12. A computer program stored on a disc and comprising a program for geocoding a database comprising the steps of:

comparing a first set of geocoded database records to second set of geographically ordered records, said first set of records each comprising a first number of data fields including data representing an identification of a geographic location corresponding to the record and data representing one of two or more geographic centroids representative of geographic areas including the location, said centroids from a centroid with highest precision to a centroid with lowest precision;

said second set of records comprising inherent geographically ordered data fields where said data represents a unique identification of a geographic location and the proximity of one record of one location to other records at other geographic locations and one or more data fields corresponding to the data fields of the records in the first set;

generating a plurality of matches where a record in the first set has a data field that matches a data field of a record in the second set;

sorting the matched sets by the centroids of the first set of records;

selecting matched sets with the highest precision centroids;

adding the geographically ordered data fields of the second set to the records matched in the first set to generate a third set of records.

13. The computer program of claim 12 comprising the further step of comparing the third set of records to the second set of records to identify records in the second set that are geographically proximate to one or more records in the third set;

changing the centroid of the identified records of the second set to correspond to the centroid of the most proximate record in the third set; and adding the geographically ordered data fields of the second set to the most proximate records of the third set.

14. The computer program of claim 12 wherein the centroids comprise at least four centroids of different precision.

15. The computer program of claim 14 wherein the centroids comprise street level, ZIP+4, ZIP+2, and ZIP.

16. The computer program of claim 12 wherein the step of selecting comprises selecting the matched sets for the highest and the second highest precision centroids.

17. The computer program of claim 16 wherein the highest and second highest precision centroids are street level and ZIP+4.

18. The computer program of claim 17 wherein the step of selecting matched sets comprises selecting matches with the highest and second highest precision centroids to create a third set of records;

and further comprising comparing the third set of records to the second set of records to identify records in the second set that are geographically proximate to one or more records in the third set;

changing the centroid of the identified records of the second set to correspond to the centroid of the most proximate record in the third set; and adding the geographically ordered data fields of the second set to the most proximate records of the third set.

19. The computer program of claim 12 wherein the records in both sets comprise data fields for the street address of the records and the matching step comprises comparing the street address data fields of records in the first set to the street address data fields of records in the second set.

20. The computer program of claim 12 comprising the further step of mapping further data to the third set of records.

21. A computer for geocoding a database comprising:
   a memory for holding a first set of geocoded database records and a second set of geographically ordered records;
   means comparing the first set of geocoded database records to the second set of geographically ordered records,
   said first set of records each comprising a first number of data fields including data representing an identification of a geographic location corresponding to the record and data representing one of two or more geographic centroids representative of geographic areas including the location, said centroids from a centroid with highest precision to a centroid with lowest precision;
   said second set of records comprising inherent geographically ordered data fields where said data represents a unique identification of a geographic location and the proximity of one record of one location to other records at other geographic locations and one or more data fields corresponding to the data fields of the records in the first set;
   means for generating a plurality of matches where a record in the first set has a data field that matches a data field of a record in the second set;
   means for sorting the matched sets by the centroids of the first set of records;
   means for selecting matched sets with the highest precision centroids;
   means for adding the geographically ordered data fields of the second set to the records matched in the first set to generate a third set of records.

22. The computer of claim 21 further comprising means for comparing the third set of records to the second set of records to identify records in the second set that are geographically proximate to one or more records in the third set;
   means for changing the centroid of the identified records of the second set to correspond to the centroid of the most proximate record in the third set; and
   means for adding the geographically ordered data fields of the second set to the most proximate records of the third set.

23. The computer of claim 21 wherein the centroids comprise at least four centroids of different precision.

24. The computer of claim 23 wherein the centroids comprise street level, ZIP+4, ZIP+2, and ZIP.

25. The computer of claim 21 wherein the means for selecting comprises means for selecting the matched sets for the highest and the second highest precision centroids.

26. The computer of claim 21 wherein the highest and second highest precision centroids are street level and ZIP+4.

27. The computer of claim 26 wherein the means for selecting matched sets comprises means for selecting matches with the highest and second highest precision centroids to create a third set of records;
   means for comparing the third set of records to the second set of records to identify records in the second set that are geographically proximate to one or more records in the third set;
   means for changing the centroid of the identified records of the second set to correspond to the centroid of the most proximate record in the third set; and
   adding the geographically ordered data fields of the second set to the most proximate records of the third set.

28. The computer of claim 21 wherein the records in both sets comprise data fields for the street address of the records and the means for matching comprises means for comparing the street address data fields of records in the first set to the street address data fields of records in the second set.

29. The computer of claim 21 further comprising means for mapping further data to the third set of records.

* * * * *